United States Patent Office 3,339,136
Patented Aug. 29, 1967

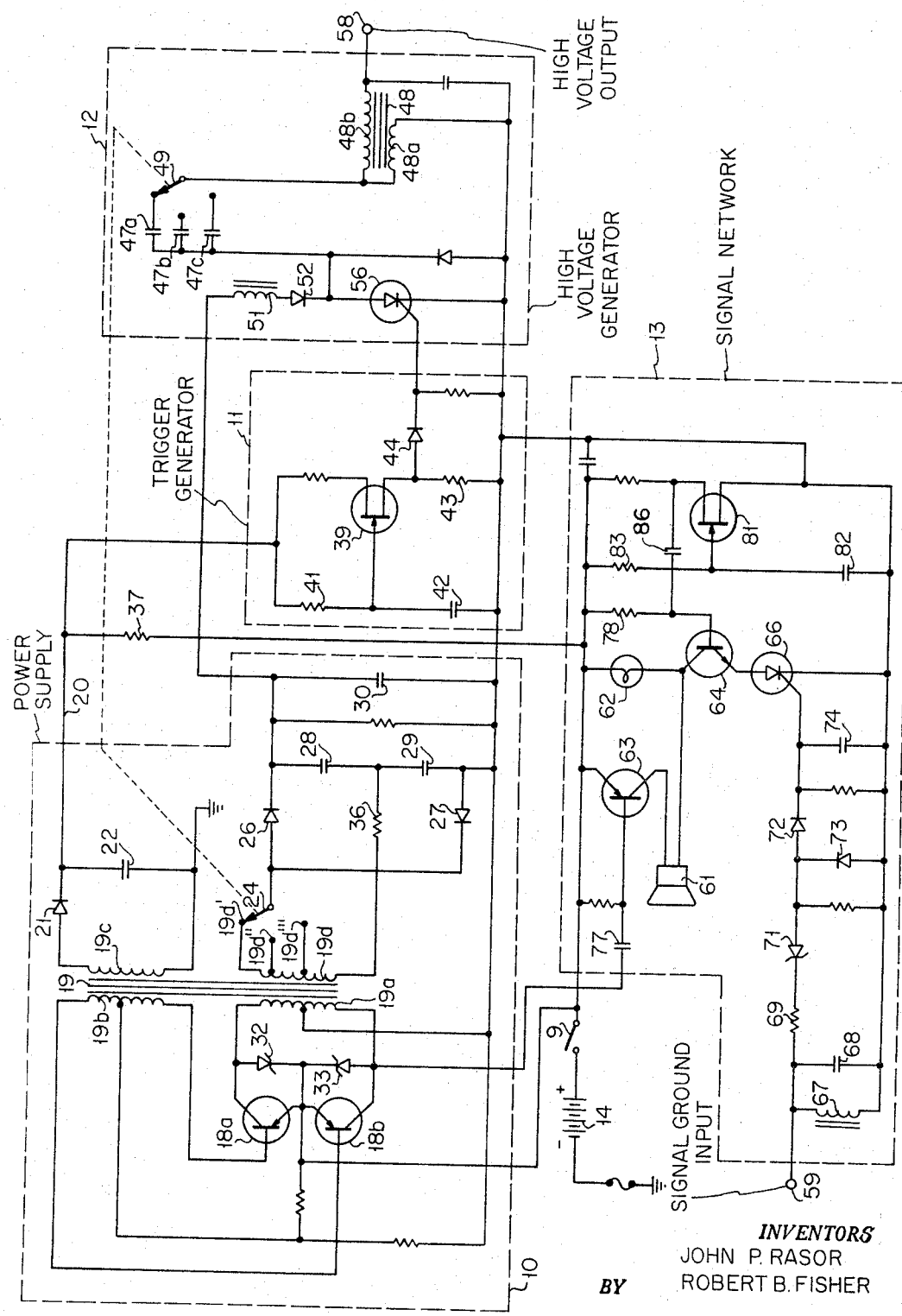

3,339,136
APPARATUS INCLUDING TIME CONTROLLED INDICATING MEANS AND CONSTANT ENERGY DISCHARGE STORAGE MEANS FOR ELECTRICALLY TESTING FOR HOLIDAYS IN INSULATING COATINGS
John P. Rasor, San Gabriel, and Robert B. Fisher, El Monte, Calif., assignors to Tinker and Rasor, San Gabriel, Calif., a corporation of California
Filed Feb. 25, 1963, Ser. No. 260,443
14 Claims. (Cl. 324—54)

This invention relates in general to detection circuitry, and relates more particularly to circuitry for detecting spark discharges of very short duration and for providing a sustained indication of their occurrence.

The present invention is particularly useful in, but not limited to, the art of "holiday" detectors, which are used to detect holidays or defects in insulating coatings or coverings, such as the insulating coating applied to pipelines. Such detectors generally involve apparatus which is moved along the coated pipelines while high voltage pulses from a controllable source are applied thereacross, and detection circuitry for determining the occurrence of a spark discharge from the high voltage pulses, indicating that the high voltage has arced through the coating at a defective point therein. In the environment of pipeline coating testing, it will be appreciated that a tester must be extremely rugged, compact and reliable and involve low power requirements, since it must usually be operated from portable power supplies, such as batteries.

One of the problems associated with holiday detectors in the past has been the fact that the spark discharge resulting from a holiday may have a duration of only a few microseconds, while it is necessary to provide an indication to an operator which has a duration sufficient to attract his attention, usually considerably longer than the spark discharge itself, but not so long that the detection circuitry is disabled for detection of subsequently occurring holidays.

In accordance with one feature of this invention, there is provided novel holiday detection apparatus which is operative to provide a sustained indication of a spark discharge resulting from a holiday, this indication having a duration considerably in excess of at least the shortest of such spark discharges, but not being so long as to render the detection apparatus ineffective to operate on an immediate subsequent holiday. This operation is achieved through the use of a device in the signal generating circuitry which is turned on when a spark discharge from a holiday occurs and which is turned off a controllable interval of time thereafter by pulses applied thereto at regular intervals from a pulse generator. The period of the pulse generator is in excess of the duration of the spark discharge itself, so that the device is effectively latched in for a period of time sufficient to insure observation of the holiday by an operator.

Another problem sometimes encountered with prior art holiday detectors arises from the fact that it is usually necessary to provide a range of pulse voltages to accommodate different types of coatings being tested, and such range has heretofore been obtained simply by varying the voltage applied to the pulse circuits, with no adjustment of the energy-storing capacity of the circuit. The result of this type of operation has been that the energy available in the pulse circuit varies directly with the voltage setting thereof, thereby producing problems of voltage regulation to the load circuit, particularly at the lower pulse voltages. In accordance with another feature of the present invention, there is provided a holiday detector having means for varying the pulse voltage applied to the exploring electrode, in which a variation in the pulse voltage produces a corresponding change in the parameters of the pulse generating circuit so that the total energy in this circuit substantially remains constant over the range of pulse voltages available. Thus, if the pulse voltage is reduced, there is simultaneously produced a corresponding increase in the energy-storing ability of the pulse generating circuit, so that the total energy available for the pulse circuit remains substantially constant, thereby providing better voltage regulation of the circuit.

It is therefore an object of the present invention to provide holiday detector circuitry which detects spark discharges resulting from holidays and provides an indication thereof, this indication having a controllable duration which usually exceeds that of the spark discharge itself, to provide sufficient time for an operator to reliably observe the indication but being sufficiently short so as to permit the detector to detect subsequently occurring holidays.

It is a further object of this invention to provide holiday detector circuitry having means for varying the pulse voltage applied to the article being tested for holidays, in which variations in the applied voltage produced corresponding variations in the energy-storing capacity of the circuit so that such energy stored remains substantially constant over the range of applied voltages.

It is an additional object of this invention to provide holiday detection apparatus which is compact, rugged, reliable and involves no moving parts.

Objects and advantages other than those set forth above will be apparent from the following description when read in connection with the accompanying drawing, the single figure of which schematically illustrates one embodiment of a holiday detector circuitry in accordance with this invention.

Referring to the drawing, there is shown a holiday detector in accordance with this invention employing a power supply 10, a trigger generator 11, a high voltage generator 12 and a signal network 13. Before proceeding with a detailed description of the device, the general operation will be described in terms of the functional components mentioned above. Power supply 10 is operative to convert the energy from a source, such as a battery 14, to a plurality of different voltages for use in other parts of the detector. Trigger generator 11 is energized from power supply 10 and is operative to supply low voltage, low impedance pulses of fast rise time to fire a gate which controls the discharge of a controllable pulse device in the high voltage generator 12. The high voltage output from generator 12 is supplied to the exploring electrode surrounding the coating to be tested. Such an exploring electrode may be of any suitable type, such as coil spring type exploring electrodes as shown in U.S. Patents 2,615,077 or 2,629,002. If a spark discharge occurs in the application of this high voltage across the coating, indicating a defect in that portion of the coating, this discharge is detected in signal network 13 to provide an indication to the operator of the defect.

*Power supply 10*

Referring to power supply 10, when switch 9 is closed, the voltage from battery 14 is converted to AC voltages and stepped up in amplitude by means including a pair of switching transistors 18a, 18b and a transformer 19 having primary windings 19a, 19b and secondary windings 19c, 19d. These elements operate as an inverter in a well known manner, with winding 19a connected to the collectors of transistors 18a, 18b, while winding 19b provides a feedback voltage to the bases of these transistors. Secondary winding 19c develops a voltage thereacross which is rectified by a diode 21 and smoothed by means including a capacitor 22 to provide on a conductor 20 a voltage which is used to control the trigger generator, as will be described more in detail below.

Secondary winding 19d has three different taps 19d', 19d", and 19d'" associated therewith which cooperate with a movable switch arm 24 to select one of the three voltage levels available from winding 19d. The particular voltage level selected will depend upon the type of coating being tested. Switch arm 24 is mechanically ganged with a switch in the trigger generator section 11, as indicated by the dotted connection, to provide the novel variation of energy-storing capacity with pulse voltage level, as will be described more in detail below. The voltage selected by the position of switch arm 24 is supplied to a voltage doubling circuit including a pair of diodes 26, 27 and capacitors 28, 29, 30, to supply a DC voltage of a level determined by the setting of switch arm 24 to a capacitor charging circuit in the high voltage generating section 12. In the power supply section, a pair of Zener diodes 32, 33 are provided between the collector and emitter of each of transistors 18a, 18b to protect these elements from excessive voltage surges, while current limiting resistors 36, 37 are provided to limit current surges in the rectifier circuits.

*Trigger generator 11*

As indicated above, the function of trigger generator 11 is to provide low voltage (such as 1.5 to 3 volts), low impedance pulses of fast rise time to control the discharge of the energy-storing elements in the high voltage generator 12. Trigger generator 11 includes an unijunction transistor 39 which operates in a well known fashion in conjunction with a resistor 41 and a capacitor 42 as a relaxation oscillator. Elements 41, 42 form an RC circuit whose time constant determines the firing rate of transistor 39, and this rate is preferably chosen to be about 30 cycles per second. In this connection, it is important that the supply voltage for trigger generator 11 maintain a value of at least 10 volts, because at this voltage and above, variations in the voltage of battery 14 do not affect the repetition rate of the trigger generator. The output pulses from the oscillator are developed across a resistor 43 and supplied through a diode 44 to the input of a device in the high voltage generator 12 which directly controls the discharge of the high voltage pulses used in the detection circuitry. Diode 44 operates to prevent reverse voltages in the high voltage section from damaging unijunction transistor 39.

*High voltage generator 12*

Generator 12 periodically generates a high voltage pulse under the control of trigger generator 11, and these pulses are supplied to the exploring electrode of the testing device. This high voltage is obtained from the discharge of the energy in a selected one of capacitors 47a, 47b, 47c through the primary winding 48a of a high voltage pulse transformer 48. The selection of one of capacitors 47a, 47b, 47c is controlled by a switch arm 49 which is mechanically ganged with switch arm 24 across secondary 19d of transformer 19. The sizes of capacitors 47a, 47b, 47c increase in that order, so that the capacity connected in the pulse generating circuit varies inversely with variations in the voltage selected by switch 24, thus providing substantially equal quantities of electrical energy storage in the pulse generating circuit for all settings of switch 24, as will be described more fully below.

The selected one of capacitors 47a, 47b, 47c is charged from the output of the voltage doubler circuit described above through a circuit which includes an inductor 51, a diode 52, the selected capacitor and through primary winding 48a of pulse transformer 48 to ground. The discharge of the selected capacitor is controlled by a silicon controlled rectifier 56 whose gate terminal receives the gating pulses from the output of the relaxation oscillator including unijunction transistor 39. When silicon controlled rectifier 56 is fired by one of such gating pulses, the selected capacitor is discharged through the silicon controlled rectifier and the primary 48a of transformer 48 to produce across the secondary winding 48b a high voltage pulse having a very fast rise time and a very good voltage regulation to the load circuit of the detector. The high voltage output pulse from secondary winding 48b is supplied to a terminal 58 labelled "high voltage output," indicating that this is the voltage applied to the exploring electrode around the pipe to be tested.

*Signal generator 13*

The signal generator section 13 includes suitable indicating means, either audible or visual or both, which are activated in response to a high voltage spark discharge in the testing circuit to provide an indication of the holiday. Such indicating means may include a speaker 61 and a lamp 62, both of which are energized upon occurrence of a spark discharge in the testing circuit. Speaker 61 and lamp 62 are controlled by means including a PNP transistor 63, an NPN transistor 64 and a silicon controlled rectifier 66. Briefly, silicon controlled rectifier 66 is triggered by occurrence of a spark discharge, transistor 63 is operative after triggering of silicon controlled rectifier 66 to supply an audio frequency signal to speaker 61, and transistor 64 is operative to control the turning off of the indicating circuits a predetermined time interval after their activation.

The input signals from the spark discharge appear at a terminal 59 labelled "signal ground input" and are supplied through an LC circuit including an inductor 67 and a capacitor 68 which act as a selective network to reduce the background noise or circulating current in the signal pickup circuit. The pickup circuit also includes a current limiting resistor 69 and a Zener diode 71 which has a breakdown voltage of a level, such as 80 volts, which blocks from the detecting circuit any stray signals having amplitudes less than this level. A pair of diodes 72, 73 act as a rectifier to supply only unidirectional signals to the control element of silicon controlled rectifier 66, while a capacitor 74 prevents stray transient voltages from firing this rectifier.

The PNP transistor 63 has an AC voltage coupled to the base thereof through a capacitor 77 from the collector of transistor 18b in the power supply. This AC signal preferably is of the square wave type with a frequency of from 400 to 800 cycles per second, and produces a conductive state in transistor 63 every half cycle of this signal.

NPN transistor 64 receives forward bias through a resistor 78, so that this device is in a normally conductive state when silicon controlled rectifier 66 is conducting. The base of transistor 64 is supplied with periodically occurring pulses which operate to momentarily turn off the transistor. These pulses are generated by a relaxation oscillator similar to that used in trigger generator 11 and employing a unijunction transistor 81 whose timing is controlled by an RC network including a capacitor 82 and a resistor 83. This timing is preferably such that this circuit produces negative pulses to the base of NPN transistor 64 at the rate of one pulse per second, the pulses being coupled from one base terminal of the oscillator transistor 81 to the base terminal of the transistor 63 through a coupling capacitor 86.

In operation, the exploding electrode used in the detecting circuit is placed around the pipeline to be inspected and the high voltage output terminal 58 is connected thereto. With switch 9 closed, trigger generator 11 is operative to generate periodic gating pulses which fire silicon controlled rectifier 56 in the high voltage generator section at a predetermined repetition rate as described. Firing of silicon controlled rectifier 56 produces high voltage pulses across secondary winding 48b of pulse transformer 48 and at the high voltage output terminal 58. In this connection, as indicated above, the selector switch represented by ganged switch arms 24 and 49 is used to vary the voltage applied to the test coil in dependence upon the nature of the pipeline coating being tested. It will be seen that when switch 24 is moved to reduce the applied voltage, the corresponding movement of switch arm 49 adds a larger amount of capacitance in the discharge circuit of silicon controlled rectifier 56, so that the total amount of energy stored in the discharge circuit is substantially the same for all settings of switch arm 24. This is a distinct advantage in providing better voltage regulation in the load circuit than would result if the same value of capacitance were utilized for all voltage settings of switch 24, thus varying the discharge energy as a function of the applied voltage.

If there is no defect or holiday in the portion of the coating adjacent the exploring electrode, the high voltage from output terminal 58 does not arc through to the signal ground input terminal 59. Under these circumstances, there is no signal of any substantial amplitude at this input terminal, so that silicon controlled rectifier 66 remains nonconductive. Since transistors 63 and 64 are essentially connected in series with silicon controlled rectifier 66 across the source represented by battery 14, when silicon controlled rectifier 66 is nonconductive there is no current flow through these transistors or through speaker 61 and lamp 62.

However, when the exploring electrode encounters a portion of coating having a holiday therein, the high voltage from terminal 58 arcs through this defective portion to the signal ground input terminal 59 to produce a substantial input voltage at this terminal. This input is coupled to the control element of silicon controlled rectifier 66, as described above, to render this device conductive and produce current flow through the series connected devices 63, 64 and 66. Conduction in transistor 63 will permit the AC signal which is coupled to the base of this transistor from the collector of transistor 18b to flow through speaker 61 to provide an audible indication of the holiday. Lamp 62 is also energized by conduction of transistor 64 and silicon controlled rectifier 66 to provide a visual indication of the holiday.

A silicon controlled rectifier of the type such as device 66 will remain conductive, once it has been fired, until its anode voltage is removed or until this voltage reverses direction. In accordance with one novel feature of this invention, this anode voltage is interrupted after predetermined time which insures that device 66 has remained conductive sufficiently long to provide notice of the detected holiday to the operator but which is not so long as to render the detector insensitive to subsequently occurring holidays. This interruption is accomplished through transistor 64 and its associated relaxation oscillator. As described above, this oscillator places periodic negative pulses on the base of transistor 64 to periodically render this device nonconductive, these pulses having a frequency of about one pulse per second. Thus, after silicon controlled rectifier 66 has been rendered conductive by the detected spark discharge, transistors 63, 64 and silicon controlled rectifier 66 remain conductive until occurrence of the next negative pulse from the relaxation oscillator which turns transistor 64 off. When transistor 64 turns off, this momentarily removes the anode voltage from silicon controlled rectifier 66 to turn this device off. The relaxation oscillator is synchronized with the detected holiday pulses to provide for an alarm time of constant duration. When silicon controlled rectifier 66 is turned on by the detected spark discharge the voltage across the same drops substantially. This voltage change is coupled through the capacitor 86 to one base terminal of the transistor 81 and serves as a negative synchronizing voltage for the relaxation oscillator. The negative pulse turns on the transistor 81, and the capacitor 82 is rapidly discharged through the forward biased PN junction of the transistor for the start of the time period. After the capacitor 82 is discharged the PN junction of the transistor 81 is reverse biased and the capacitor 82 charges through the resistor 83 (and by the small amount of current flowing through the reverse-biased PN junction.) When the capacitor voltage reaches a sufficient level to forward bias the PN junction of the transistor 81 the capacitor 82 rapidly discharges through the transistor whereby a negative pulse is produced at the one transistor base, which pulse is coupled through the capacitor 86 to the base of transistor 64 to turn it off. As described above, this effectively opens the silicon controlled rectifier 66 circuit to turn off the alarm. The alarm period is therefore always of substantially the same length.

Thus, upon detection of a holiday in the pipeline coating being tested, an input is supplied to the detection circuitry in the signal generator, and even though the input itself may have a duration of only a few microseconds, the alarm or indicating apparatus is energized for a significantly longer period, such as a full second, to provide ample time for the operator to observe and act on the detected holiday. However, the indication provided by speaker 61 and lamp 62 does not have such a long duration that it interferes with detection of a subsequently occurring holiday, since the relaxation oscillator is operative to turn off transistor 64 after an interval, such as one second, to de-energize the detecting rectifier and place it in condition for detection of the next holiday.

Without meaning to limit the scope of the invention, the following table lists values or types for the components of the illustrated embodiment which we have found particularly suitable to produce a reliable, rugged, compact holiday detector having no moving parts.

Resistors:

| | Ohms |
|---|---|
| 36 | 47 |
| 37 | 390 |
| 41 | 470 |
| 43 | 47 |
| 69 | 1.5K |
| 78 | 2.2K |

Capacitors:

| | Mfd. |
|---|---|
| 28 | 30 |
| 29 | 30 |
| 30 | 12 |
| 42 | 0.1 |
| 47a | 0.4 |
| 47b | 2 |
| 47c | 10 |
| 68 | 0.1 |
| 74 | .01 |
| 77 | 50 |
| 82 | 2 |

Others:

| | |
|---|---|
| 18a, 18b | 2N1038 |
| 21, 26, 27, 44, 52 | 1N1491 |
| 32, 33 | 1N723 |
| 39, 81 | 2N1671A |
| 56 | C15U |
| 63 | 2N1378 |
| 64 | 2N1308 |
| 66 | C15B |
| 71 | IN3042 |
| 72, 73 | 1N91 |

What we claim is:
1. A holiday detector comprising:
power supply means,
energy-storing means including capacitor means,
means for supplying energy to said energy-storing means from said power supply means,
a high voltage pulse transformer having a primary winding and a secondary winding,
trigger means energized from said power supply means for periodically discharging said energy-storing means at a predetermined rate, said energy-storing means discharging through said primary winding to produce a high voltage pulse across said secondary winding, means for applying said high voltage pulse across a material to be tested for holidays, indicating means responsive to occurrence of a spark discharge through said material from said high voltage pulse for providing an indication of said holiday, and means including oscillator means for de-energizing said indicating means a predetermined time after energization independently of the duration of said spark discharge.

2. The holiday detector defined by claim 1 including means for triggering said oscillator means upon occurrence of a spark discharge through said material.

3. A holiday detector comprising:

means for applying periodic high voltage pulses across a material to be tested for holidays, a first device which is rendered conductive upon occurrence of a spark discharge through said material from one of said high voltage pulses, indicating means responsive to conductivity of said first device for providing an indication of said holiday, a second device connected in circuit with and controlling the energization of said first device, and means for alternately rendering said second device conductive and nonconductive at a predetermined rate such that periods of conductivity of said second device are longer than the duration of said spark discharge, whereby said first device is maintained conductive for substantially the length of one of said periods when one of said spark discharges occurs, to provide an indication from said indicating means having a duration of substantially said period.

4. The holiday detector defined by claim 3 wherein said means for alternately rendering said second device conductive and nonconductive at a predetermined rate comprises an oscillator which is supplied with a synchronizing trigger pulse upon occurrence of a spark discharge through said material.

5. A holiday detector comprising:

means for applying periodic high voltage pulses across a material to be tested for holidays, a first device which is rendered conductive upon occurrence of a spark discharge through said material from one of said high voltage pulses, audible and visual indicating means responsive to conductivity of said first device for providing an indication of said holiday, a second device connected in circuit with and controlling the energization of said first device, and means comprising an oscillator triggered upon occurrence of one of said spark discharges for alternately rendering said second device conductive and nonconductive at a predetermined rate such that periods of conductivity of said second device are longer than the duration of said spark discharge, whereby said first device is maintained conductive for substantially the length of one of said periods when one of said spark discharges occurs, to provide an indication from said indicating means having a duration of substantially said period.

6. A holiday detector comprising:

power supply means, energy-storing means including capacitor means, means for supplying energy to said energy-storing means from said power supply means, trigger means energized from said power supply means for periodically discharging said energy-storing means at a predetermined rate to produce periodic high voltage pulses, means for applying said high voltage pulse across a material to be tested for holidays, signal generating means including a first device which is rendered conductive upon occurrence of a spark discharge through said material from one of said high voltage pulses, indicating means responsive to conductivity of said first device for providing an indication of said holiday, a second device connected in circuit with and controlling the energization of said first device, and means for alternately rendering said second device conductive and nonconductive at a predetermined rate such that periods of conductivity of said second device are longer than the duration of said spark discharge, whereby said first device is maintained conductive for substantially the length of one of said periods when one of said spark discharges occurs, to provide an indication from said indicating means having a duration of substantially said period.

7. The holiday detector defined by claim 6 wherein said means for alternately rendering said second device conductive and nonconductive comprises a relaxation oscillator which is triggered by pulses received from said second device upon occurrence of a spark discharge through said material.

8. A holiday detector comprising:

power supply means for producing a plurality of voltages, energy-storing means including capacitor means, means for supplying energy to said energy-storing means from said power supply means, means for varying the level of the voltage supplied from said power supply means to said energy-storing means, means operated in common with said voltage-varying means for varying the amount of capacitance of said capacitor means included in said energy-storing means inversely with variations in said supplied voltage to produce substantially constant energy storage in said energy-storing means for all values of said supplied voltage, trigger means energized from said power supply means for periodically discharging said energy-storing means at a predetermined rate to produce periodic high voltage pulses, means for applying said high voltage pulses across a material to be tested for holidays, and indicating means responsive to occurrence of a spark discharge through said material from one of said high voltage pulses for providing an indication of said holiday.

9. A holiday detector comprising:

energy-storing means including capacitor means, means for supplying energy to said energy-storing means, means for varying the level of the voltage supplied to said energy-storing means, means operated in common with said voltage-varying means for varying the amount of capacitance of said capacitor means included in said energy-storing means inversely with variations in said supplied voltage to produce substantially constant energy storage in said energy-storing means for all values of said supplied voltage, trigger means for periodically discharging said energy-storing means at a predetermined rate to produce periodic high voltage pulses, means for applying said high voltage pulses across a material to be tested for holidays, and indicating means responsive to occurance of a spark discharge through said material from one of said high voltage pulses for providing an indication of said holiday.

10. A holiday detector comprising:
power supply means for producing a plurality of voltages,
energy-storing means including capacitor means,
means for supplying energy to said energy-storing means from said power supply means,
means for varying the level of the voltage supplied from said power supply means to said energy-storing means,
means operated in common with said voltage-varying means for varying the amount of capacitance of said capacitor means included in said energy-storing means inversely with variations in said supplied voltage to produce substantially constant energy storage in said energy-storing means for all values of said supplied voltage,
a high voltage pulse transformer having a primary winding and a secondary winding,
trigger means energized from said power supply means for periodically discharging said energy-storing means at a predetermined rate, said energy-storing means discharging through said primary winding to produce periodic high voltage pulses across said secondary winding,
means for applying said high voltage pulses across a material to be tested for holidays, and
indicating means responsive to occurrence of a spark discharge through said material from one of said high voltage pulses for providing an indication of said holiday.

11. A holiday detector comprising:
power supply means for producing a plurality of voltages,
energy-storing means including capacitor means,
means for supplying energy to said energy-storing means from said power supply means,
means for varying the level of the voltage supplied from said power supply means to said energy-storing means,
means operated in common with said voltage-varying means for varying the amount of capacitance of said capacitor means included in said energy-storing means inversely with variations in said supplied voltage to produce substantially constant energy storage in said energy-storing means for all values of said supplied voltage,
a high voltage pulse transformer having a primary winding and a secondary winding,
trigger means energized from said power supply means for periodically discharging said energy-storing means at a predetermined rate, said energy-storing means discharging through said primary winding to produce periodic high voltage pulses across said secondary winding,
means for applying said high voltage pulses across a material to be tested for holidays,
a first device which is rendered conductive upon occurrence of a spark discharge through said material from one of said high voltage pulses,
indicating means responsive to said first device becoming conductive for providing an indication of said holiday, and
means for alternately rendering said second device conductive and nonconductive at a predetermined rate, said rate producing periods of conductivity of said second device which are longer than the duration of said spark discharge,
whereby said first device is maintained conductive for substantially the length of one of said periods when one of said spark discharge occurs, to provide an indication from said indicating means having a duration of substantially said period.

12. The holiday detector defined by claim 11 wherein said means for alternately rendering said second device conductive and nonconductive comprises a relaxation oscillator which is triggered upon occurrence of a spark discharge.

13. In a holiday detector,
an adjustable voltage power supply means,
adjustable capacitance capacitor means,
means for supplying energy to said capacitor means from said power supply means, means operated in common with said capacitor means and power supply means for simultaneously varying both the voltage of the power supply means and capacitance of the capacitor means such that the voltage supplied to said capacitor means is inversely related to the capacitance of said capacitor means to provide substantially constant energy storage in said capacitor means for different values of supplied voltage, and
means for discharging said capacitor means across a material to be tested for holidays.

14. In a holiday detector,
an adjustable voltage power supply means,
adjustable capacitance capacitor means,
means for supplying energy to said capacitor means from said power supply means,
means operated in common with said capacitor means and power supply means for simultaneously adjusting both the voltage of the power supply means and capacitance of the capacitor means to provide substantially constant energy storage in said capacitor means for different values of supplied voltage, and
means for discharging said capacitor means across a material to be tested for holidays.

References Cited

UNITED STATES PATENTS

| | | | |
|---|---|---|---|
| 2,249,157 | 7/1941 | Morgan et al. | 324—55 |
| 2,280,119 | 4/1942 | Gorman et al. | 324—54 |
| 2,304,513 | 12/1942 | Stearns | 324—54 |
| 2,436,615 | 2/1948 | Stearns | 324—54 |
| 2,477,084 | 7/1949 | Rehman | 320—1 X |
| 2,677,799 | 5/1954 | Foster et al. | 320—1 |
| 2,901,695 | 8/1959 | Weed | 324—54 X |
| 2,920,270 | 1/1960 | Saw | 324—54 |
| 2,983,868 | 5/1961 | Siberbach et al. | 324—70 |
| 3,005,155 | 10/1961 | Faria | 324—70 |
| 3,045,176 | 7/1962 | Voltmann | 324—54 |
| 3,068,418 | 12/1962 | Hajian | 328—150 X |
| 3,113,241 | 12/1963 | Yonushka. | |
| 3,113,293 | 12/1963 | Breese et al. | |

FOREIGN PATENTS 507,450  11/1954  Canada.

RUDOLPH V. ROLINEC, *Primary Examiner.*

WALTER L. CARLSON, *Examiner.*

G. R. STRECKER, *Assistant Examiner.*